Patented Aug. 25, 1936

2,051,859

UNITED STATES PATENT OFFICE 2,051,859

POLYMERIZATION OF OLEFINS

Vladimir Ipatieff and Vasili Komarewsky, Chicago, Ill., assignors to Universal Oil Products Company, Chicago, Ill., a corporation of Delaware No Drawing. Application May 26, 1934, Serial No. 727,740

4 Claims. (Cl. 196—10)

This invention relates more particularly to the polymerization of ethylene.

In a more specific sense the invention is concerned with a process using specific catalytic materials which permit the formation of ethylene polymers under moderate conditions of temperature and pressure so that there is a preponderating yield of hydrocarbons boiling within the normal range of gasoline.

The polymerization of olefins, which may be defined as the union of identical or similar molecules of unsaturated chain hydrocarbons to produce compounds of higher molecular weight but of similar percent composition, may be brought about by different agencies depending upon the amount and character of the unsaturation in the compound, its molecular weight, and the degree of polymerization desired.

Heat and pressure may be employed to produce polymers under the above definition but when substantial yields are obtained there is frequently a large amount of undesirable side reactions resulting in the formation not only of polymers of undesirably high molecular weight but also the formation of cyclic compounds due to reactions of ring closure and some complicated decomposition and recomposition reactions resulting in the separation of hydrogen on the one hand and carbon on the other. This method of polymerizing unsaturated hydrocarbons such as mono olefins with which the present invention is concerned therefore possesses serious disadvantages both as to yield and quality of product. In some cases, particularly in the case of ethylene, the reactions of thermal decomposition become exothermic and the process gets out of control, even to the point of introducing serious hazards to the operator.

Olefins are polymerizable under less severe conditions of temperature and pressure when various catalysts are employed among which may be mentioned sulfuric acid, aluminum chloride, zinc chloride, phosphoric acid, etcetera. When using acid and saline compounds of these types the speed and character of the polymerization varies according to the particular catalyst and the conditions of operation which may be chosen. Some compounds such as aluminum chloride have a vigorous polymerizing action but at the same time form intermediate addition complexes which consume valuable hydrocarbon material and correspond to a lessening of the effective catalytic energy. When using sulfuric acid even under the most carefully selected and controlled conditions of operation there is always some oxidation and a large amount of ester formation so that not only are polymers formed but alcohols are also producible by further hydrolysis of the esters.

It is a matter of general observation that ethylene, the lowest molecular weight member of the homologous series of mono olefins, is most resistant to selective polymerization. Under considerably elevated conditions of temperature and pressure and in the presence of metallic catalysts, it shows a tendency to decompose to form hydrogen, methane, ethane, etcetera, and high molecular weight compounds of both an open and a closed chain structure. With a sulfuric acid catalyst the principal reaction is absorption to form consecutively mono and diethyl sulfate. Phosphoric acid shows approximately the same tendency to ester formation. Aluminum chloride exerts a vigorous action and rather tends to form higher molecular weight polymers of the character of lubricating oils. With zinc chloride at about 275° C. and 70 to 100 atmospheres pressure, polymerization of ethylene begins but the reaction products according to published references are principally paraffins, the ratio of paraffins to olefins being approximately 2 to 1.

In one specific embodiment the present invention comprises the polymerization of ethylene by phosphoric acid in the presence of liquid mono olefins.

It is a feature of the present invention that ethylene may be polymerized at an economical rate at temperatures between 150 and 220° C. and pressures between 5 and 20 atmospheres when using phosphoric acid catalysts along with liquid olefins, whereas in the absence of the liquid olefins comparable rates of polymerization are only attained at temperatures above 280° C. and pressures of 50 atmospheres or higher. The reason for this is not entirely attributable to the solvent action of the liquid olefins which would tend to concentrate the ethylene and increase its intimacy of contact with the phosphoric acid since we have found that other hydrocarbon liquids having the same or a substantially equivalent solvent action do not in any way accelerate the rate of polymerization.

The compounds produced when polymerizing ethylene according to the present process are principally olefinic in character when the upper temperature and pressure limits are not exceeded. There is, however, some formation of cyclic compounds and a certain percentage of paraffin hydrocarbons. When operating the process above 220° C. and at pressures above 20 atmospheres, paraffins and cyclic hydrocarbons are formed in increasing quantity and it is noted that lubricating oil fractions are produced.

In carrying out the process several alternative modes of operation are possible depending upon whether the operation is batch, intermittent or continuous, upon the boiling range of the liquid olefin or mixture of liquid olefins employed and the form or phase of the phosphoric acid catalyst. In regard to the last named factor it may be stated that any of the three phosphoric acids, ortho, pyro or meta, may be employed, either singly or in admixture or supported upon or adsorbed in various types of relatively inert and usually siliceous spacing or carrying materials such as, for example, Fuller's earth, clays (raw or acid treated), bentonite, montmorillonite, kieselguhr, silica gel, etcetera.

In the case of batch operations employing a phosphoric acid which is liquid at the temperature of treatment, the acid may be added to a suitably designed pressure vessel along with a certain amount of liquid olefin and ethylene introduced under pressure until a safe capacity of the bomb is reached or the rate of polymerization attains a practical value. To hasten the polymerization, the bomb may be rotated to cause agitation of the liquid contents and their contacting with the gaseous ethylene. This addition of ethylene may be repeated until the rate of polymerization drops below a practical value either due to the filling of the bomb with liquid or the contamination of the catalyst. After the reactions are complete the contents of the bomb may be segregated by separately removing the hydrocarbon and acid layers. The acid catalyst may be subjected to any regeneration or purification steps necessary to render it fit for further use and the olefin mixture fractionated to obtain motor fuel boiling range fractions and a mixture of olefin polymers which can be recycled and employed for assisting in the polymerization of further amounts of ethylene.

The above type of reaction may be made substantially continuous by modifying the apparatus employed so that the ethylene may be injected into a continuously flowing mixture of liquid olefin and liquid phosphoric acid, the products of the reactions being continuously separated in succeeding chambers.

When employing solid catalysts containing a phosphoric acid as the active ingredient, batch operations may be conducted if means are employed to maintain the solid catalyst particles in suspension in the liquid olefin, though as a rule the most effective and practical operation is to use the solid catalyst as filler in a treating tower while flowing the liquid olefin downwardly thereover and the ethylene upwardly countercurrent to the descending liquid. In such a case any ethylene which may escape polymerization during its first contact with the liquid olefin and solid catalyst may be brought back to the fresh gas inlet line for further treatment.

The process of the present invention is particularly adapted to the recovery of ultimate values from the olefins present in the fixed hydrocarbon gas mixtures produced incidental to oil cracking operations in which gasoline is the main product, the present process being in a sense the final step in producing maximum yields of gasoline boiling range liquids. For example, cracking plant gases normally contain besides ethylene, quantities of propylene, butylenes, and amylenes from approximately 10 to 35% by volume of the total gas mixture. These olefins of higher molecular weight than ethylene are much more susceptible to mild polymerizing influences, and may, for example, be converted to gasoline boiling range liquids corresponding approximately to their di and trimeric forms by utilizing either liquid or solid phosphoric acid catalyst under such moderate conditions as temperatures of from 250° to 550° F. and pressures of the order of 100 pounds per square inch. Under such conditions the ethylene is substantially unaffected.

In order to polymerize the ethylene a selected polymer fraction from the 3, 4, and 5 carbon atom hydrocarbons of a cracked gas mixture (of which the mixture of nonylenes corresponding to trimers of propylene is a good example), may be used, the gases containing the residual unpolymerized ethylene or an ethylene concentrate made by liquefaction processes being brought into contact with the selected polymer fraction in the presence of phosphoric acid catalysts by some one of the methods already described and polymerized to further increase the yield of gasoline hydrocarbons.

The following example is illustrative of the general types of results obtainable and though it is limited to the use of a particular liquid olefin and ortho phosphoric acid, the invention in general is not to be so limited, as other examples involving other olefins and other acids of phosphorus are available.

50 parts by weight of a nonylene fraction (a mixture of the trimers of propylene) and 50 parts by weight of 89% orthophosphoric acid were added to a pressure treater after which 50 parts by weight of ethylene were pumped in to raise the pressure to 20 atmospheres. The supply of ethylene was cut off, the bomb heated to 220° C. and rotated to effect contact between the ethylene and the liquid contents.

The hydrocarbon liquid recovered from the bomb after this treatment had a boiling range of from 40 to 300° C., 85% of which boiled from 40 to 225° C., corresponding to the ordinary range of commercial motor fuel. The blending octane number was 95 by the motor method and the liquid possessed all the other desirable properties of a commercial motor fuel, to-wit, a water white color, a low sulfur content and complete stability under ordinary storage conditions.

The preceding specification describing the character and scope of the invention and the single numerical example are each sufficient for their respective purposes but neither is to be construed in any unduly limiting sense.

We claim as our invention:

1. A process for the conversion of ethylene into liquid hydrocarbons which comprises subjecting the ethylene to the action of a phosphoric acid under polymerizing conditions of temperature and pressure and in the presence of a sufficient quantity of an extraneous liquid mono olefin to permit polymerization of ethylene in the presence of phosphoric acid at a temperature of from 150° C. to 220° C. and under a pressure between 5 and 20 atmospheres.

2. A process for the treatment of a gaseous hydrocarbon mixture containing ethylene to convert the ethylene into liquid hydrocarbons, which comprises subjecting said mixture to the action of a phosphoric acid under polymerizing conditions of temperature and pressure and in the presence of a sufficient quantity of an extraneous liquid mono olefin to permit polymerization of ethylene in the presence of phosphoric acid at a temperature of from 150° C. to 220° C. and under a pressure between 5 and 20 atmospheres.

3. A process for the conversion of ethylene into liquid hydrocarbons, which comprises subjecting the ethylene to the action of phosphoric acid under polymerizing conditions of temperature and pressure and in the presence of a sufficient quantity of an extraneous liquid mono olefin hydrocarbon having an average molecular weight higher than hexylene to permit polymerization of ethylene in the presence of phosphoric acid at a temperature of from 150° C. to 220° C. and under a pressure between 5 and 20 atmospheres.

4. A process for producing liquids from hydrocarbon gases predominating in ethylene, which comprises subjecting the hydrocarbon gas to the action of a phosphoric acid under temperature and pressure conditions adequate to polymerize the ethylene and in the presence of a sufficient quantity of an extraneous liquid mono olefin to permit polymerization of ethylene in the presence of phosphoric acid at a temperature of from 150° C. to 220° C. and under a pressure between 5 and 20 atmospheres.

VLADIMIR IPATIEFF.
VASILI KOMAREWSKY.